(12) United States Patent
Wang (10) Patent No.: US 6,219,168 B1
(45) Date of Patent: Apr. 17, 2001

(54) SINGLE ROTATING POLYGON MIRROR WITH ADJACENT FACETS HAVING DIFFERENT TILT ANGLES

(75) Inventor: Mark Shi Wang, Irvine, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/467,739

(22) Filed: Dec. 20, 1999

(51) Int. Cl.[7] .................................................. G02B 26/08
(52) U.S. Cl. ...................... 359/216; 359/201; 359/203; 359/204; 359/206; 347/243; 347/244
(58) Field of Search ..................... 359/201–206, 359/216–219; 235/462.39; 347/233–235, 243, 244

(56) References Cited

U.S. PATENT DOCUMENTS

| 5,223,700 | 6/1993 | Takenaka | 235/467 |
| 5,646,766 | 7/1997 | Conemac | 359/204 |
| 5,815,300 | * | 9/1998 | Ohkawa et al. | 359/196 |

* cited by examiner

Primary Examiner—James Phan
(74) Attorney, Agent, or Firm—William W. Propp (57) ABSTRACT

A single rotating polygon mirror with adjacent facets having different tilt angles reflects and splits the scanning beam to multiple photoreceptors in a raster output scanning (ROS) system. The mirror can have two or four alternating facets with different tilt angles. Two different light beams form two different light sources can be reflected and split from the polygon mirror contemporaneously to multiple photoreceptors. The split beams from the polygon mirror facets can share a common f-theta scan lens.

17 Claims, 6 Drawing Sheets

SINGLE ROTATING POLYGON MIRROR WITH ADJACENT FACETS HAVING DIFFERENT TILT ANGLES

BACKGROUND OF THE INVENTION

The present invention relates to a single common rotating polygon mirror in a raster output scanning (ROS) system for multiple photoreceptors and, more particularly, to a single rotating polygon mirror with adjacent facets having different tilt angles to reflect and split the scanning beam to multiple photoreceptors.

Printing systems utilizing lasers to reproduce information are well known in the art. The printer typically uses a Raster Output Scanner (ROS) to expose the charged portions of the photoreceptor to record an electrostatic latent image thereon. Generally, a ROS has a laser for generating a collimated beam of monochromatic radiation. This laser beam is modulated in conformance with image information. The modulated beam is transmitted through a lens onto a scanning element, typically a rotating polygon having mirrored facets.

The light beam is reflected from a facet and thereafter focused to a "spot" on the photosensitive medium. The rotation of the polygon causes the spot to scan across the photoreceptor in a fast scan (i.e. line scan) direction. Meanwhile, the photoreceptor is advanced relatively more slowly than the rate of the fast scan in a slow scan (process) direction which is orthogonal to the fast scan direction. In this way, the beam scans the photoreceptor recording medium in a raster scanning pattern. The light beam is intensity-modulated in accordance with an input image information serial data stream so that individual picture elements ("pixels") of the image represented by the data stream are exposed on the photoreceptor to form a latent image, which is then transferred to an appropriate image receiving medium such as paper. Laser printers may operate in either a single pass or a multiple pass system.

In a single pass, process color system, three ROS systems are positioned adjacent to a photoreceptor surface and selectively energized to create successive image exposures, one for each of the three basic colors. A fourth ROS system may be added if black images are to be created as well. In a multiple pass system, each image area on the photosensitive medium must make at least three passes relative to the scan line formed by the modulated laser beam generated by a single ROS system.

Problems with these color printing systems include the high cost related to the use of multiple ROSs, the high cost of producing nearly identical multiple ROSs and associated optics, and the difficulty of aligning or registering the system colors.

Traditionally, a single beam ROS has a single light source which emits a single modulated light beam which is reflected from the facets of the rotating polygon mirror to scan a single line on a single photoreceptor. Three or four ROS systems are used to provide color printing.

A multiple beam ROS has either a single light source which emits two or more different modulated light beams or multiple light sources which emit multiple different modulated light beams. These multiple beams are collimated by the same single collimated lens and then focused by the same single cylindrical lens onto the facets of a single rotating polygon mirror. After reflecting from the facet, the multiple beams pass through f-theta scan lenses and motion compensating optical elements to scan multiple lines on a single photoreceptor.

One successful way to increase the photoreceptor speed is to employ multiple or "multispot" diode lasers. A multispot diode laser is a single device that has a plurality of closely spaced semiconductor lasers. The use of multispot diode lasers enables two or more independently addressable laser beams to be modulated together, thereby increasing the number of scan lines that are discharged across the photoreceptor during a single sweep.

Typically, the facets of the polygon mirror are uniform in shape and uniform in tilt angle relative to the axis of rotation. Any minute differences in size and angle from facet to facet are treated as "wobble" or "bow" errors in the ROS to be corrected by lens and mirrors before the light beam is scanned across the photoreceptor.

A bar code reader patent to Takenaka (U.S. Pat. No. 5,223,700) proposed the facets of a polygon mirror have different lengths along the circumference of the mirror. A wider facet gives a longer scan line while a shorter facet gives a shorter scan line.

A laser beam scanner patent to Conemac (U.S. Pat. No. 5,646,766) suggests tilting the facets of a polygon mirror in the y-direction along the fast scan (i.e. line scan) direction to space the scanning light beam spots closer together on the scan line.

However, both the Takenaka and Conemac patents have the facets of the polygon mirror adjust the spot distribution on a single scan line on a single photoreceptor.

It is an object of this invention to provide a single rotating polygon mirror with adjacent facets having different tilt angles to reflect and split the scanning beam to multiple photoreceptors in a raster output scanning (ROS) system.

SUMMARY OF THE INVENTION

According to the present invention, a single rotating polygon mirror with adjacent facets having different tilt angles reflects and splits the scanning beam to multiple photoreceptors in a raster output scanning (ROS) system. The mirror can have two or four alternating facets with different tilt angles. Two different light beams form two different light sources can be reflected and split from the polygon mirror contemporaneously to multiple photoreceptors. The split beams from the polygon mirror facets can share a common f-theta scan lens.

Other objects and attainments together with a fuller understanding of the invention will become apparent and appreciated by referring to the following description and claims taken in conjunction with the accompanying drawings.

DETAILED DESCRIPTION OF THE INVENTION

Figure 1:
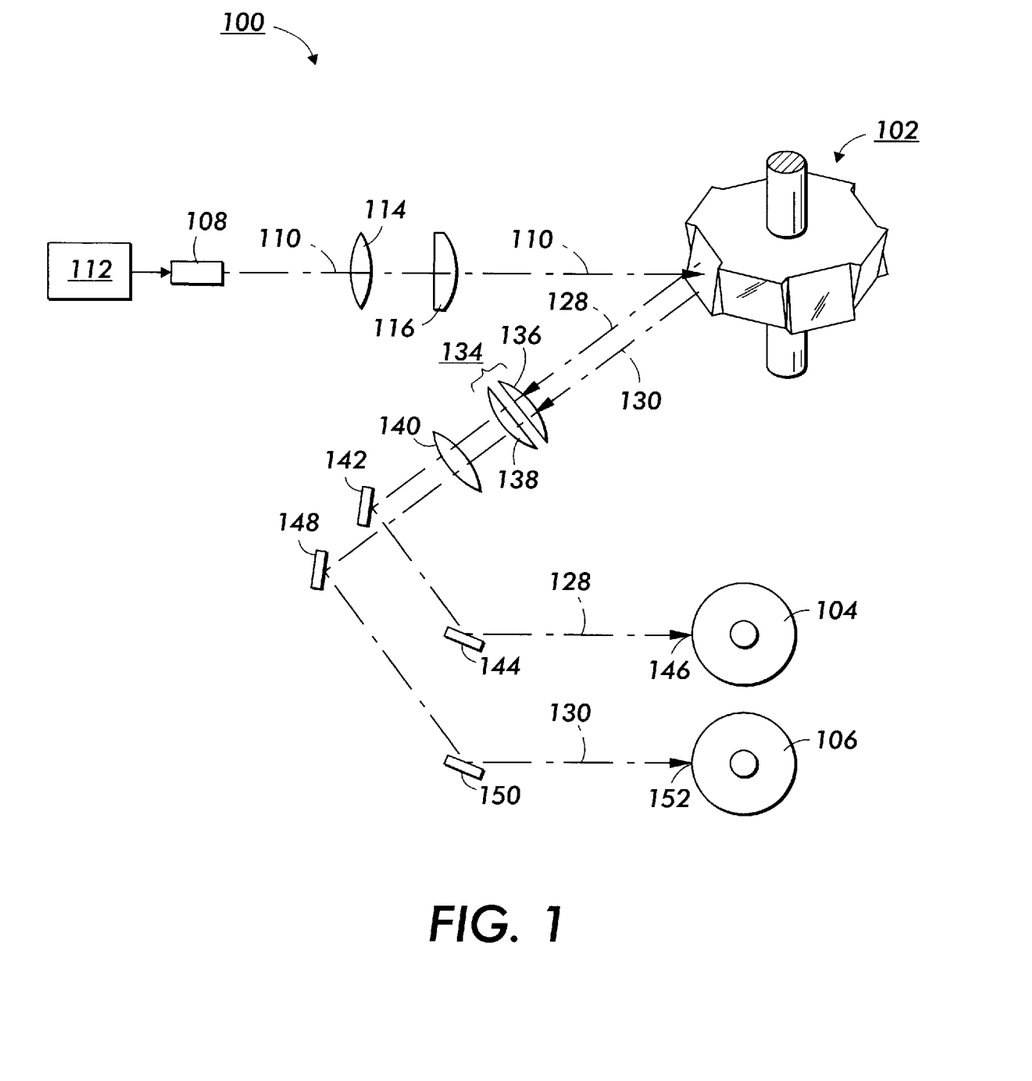
FIG. 1 illustrates a side view of the raster output scanning (ROS) system with a single rotating polygon mirror with adjacent facets having different tilt angles to reflect and split the scanning beam to two photoreceptors of the present invention.

Reference is now made to FIG. 1, wherein there is illustrated a raster output scanning (ROS) system 100 with a single rotating polygon mirror 102 with adjacent facets having different tilt angles to reflect and separate the scanning beam to a first photoreceptor 104 and a second photoreceptor 106 as an embodiment of the present invention.

A light source, 108, such as a laser diode, emits a modulated coherent light beam 110 of a single wavelength. The light beam 110 is modulated in conformance with the information contained in the video signal sent from image output control circuit 112 to the light source 108.

The modulated light beam 110 is collimated by a collimating lens 114.

The collimated light beam 110 is focused by a cylindrical lens 116 onto the facets of the rotating polygon mirror 102.

Figure 2:
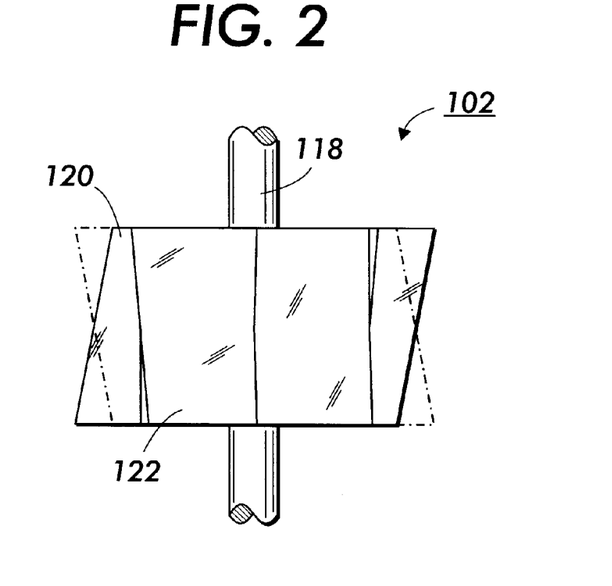
FIG. 2 illustrates a side view of the rotating polygon mirror with adjacent facets having different tilt angles of FIG. 1.
Figure 3:
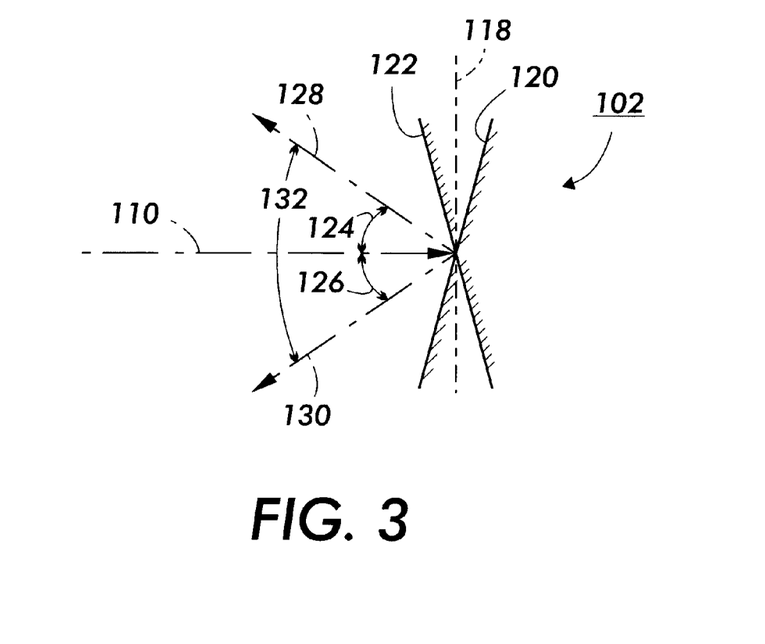
FIG. 3 illustrates a side view of a light beam reflected and split into two beams by the rotating polygon mirror with adjacent facets having different tilt angles of FIG. 1.

As best seen in FIGS. 2 and 3, the polygon mirror 102 of the present invention rotates around an axis of rotation 118 by a conventional motor (not shown), known to those of ordinary skill in the art. The polygon mirror 102 has a series of alternating reflective facets with a first facet 120 adjacent to a second facet 122. This polygon could have any number of facets, while for this application, the rotating polygon has eight distinct facets.

Rather than having the plane of each facet parallel to the axis of rotation 118, the facets 120 and 122 are tilted at an angle to the axis of rotation 118 denoted as the "tilt angle", sometimes referred to as the "draft angle". The first facet 120 will have a first tilt angle 124 while the second facet 122 will have a second tilt angle 126. The first tilt angle 124 is different from the second tilt angle 126. Typical tilt angles are in the range of 0.5 to 5 degrees if the two beams are to share optical element. If the beams have separate optical elements, then the tilt angles can be greater than 10 degrees. The tilt angles 124 and 126 are shown exaggerated in the Figures for ease of understanding.

The modulated light beam 110 is typically perpendicular to the axis of rotation 118. The modulated light beam is incident at an angle of incidence of 0.5 to 5 degrees to the first facet and the second facet. The light strikes the facet and is reflected off with the normal angle of incidence equaling the angle reflection.

The modulated light beam 110 will reflect from the first facet 120 at the first tilt angle 124 becoming the first reflected modulated beam 128. The polygon mirror 102 will rotate and the modulated light beam 110 will reflect from the second facet 122 at the second tilt angle 126 becoming the second reflected modulated beam 130. The first facet 120 and the second facet 122 are flat mirror surfaces with no optical power.

The adjacent first facet and second facet 120 and 122 alternate along the circumference of the rotating polygon mirror 102 effectively splitting the modulated light beam 110 into two beams: i.e., the first reflected modulated beam 128 and the second reflected modulated beam 130, as the incident light beam 110 strikes the rotating polygon mirror. The two reflected modulated light beams 128 and 130 will have an angular separation 132 of 1 to 10 degrees equivalent to the combination of the first tilt angle 124 and the second tilt angle 126.

Returning to FIG. 1, the modulated light beam 110 is reflected from the facets 120 and 122 of the rotating polygon mirror 102 as a first reflected modulated beam 128 and a second reflected modulated beam 130.

The two beams 128 and 130 then pass through a f-theta scan lenses 134 consisting of a negative plano-spherical lens 136 and a positive plano-spherical lens 138. This f-theta scan lenses configuration has sufficient barrel distortion to produce a linear scan beam which then passes through a cylindrical lens 140.

The cylindrical lens will flatten the field curvature of the beam from the f-theta lenses while the f-theta scan lenses together with the cylinder lens produces a linear, flat-field scan beam. The f-theta lenses are designed with the cylindrical lens because the cylindrical lens may contribute a small, but non-negligible, amount of distortion, especially at large scan angles.

The angular beam separation 132 is small enough so that the two beams 128 and 130 can pass through the same single f-theta scan lenses 134.

A first fold mirror 142 (sometimes referred to as a "pick-off" mirror) will reflect the first reflected modulated beam 128 from the f-theta scan lenses 134 and cylindrical lens 140 to the first motion compensating optical (MCO) element 144, which is a wobble correction mirror in this embodiment. The MCO element can consist of a cylindrical mirror or a cylindrical lens. The MCO element helps correct for wobble of the rotating polygon mirror 102.

The first motion compensating optical (MCO) element 144 will also focus the first reflected modulated beam 128 onto a scan line 146 on the first photoreceptor 104.

A second fold mirror 148 will reflect the second reflected modulated beam 130 from the f-theta scan lenses 134 and cylindrical lens 140 to the second motion compensating optical (MCO) element 150, which is a wobble correction mirror in this embodiment. The MCO element can consist of a toroidal surface in the f-theta lenses, a cylindrical mirror or a cylindrical lens. The MCO element helps correct for wobble of the rotating polygon mirror 102.

The second motion compensating optical (MCO) element 150 will also focus the second reflected modulated beam 130 onto a scan line 152 on the second photoreceptor 106.

The light beam 110 is modulated in conformance with the information contained in the video signal sent from image output control circuit 112 to the light source 108. The image output control circuit 112 contains the circuit and logic modules which respond to the input video data signals to modulate the light beam 110. The image output control circuit 112 also contains the other control and timing signals to control the rotation of the polygon mirror by the motor (not shown) and operate the first photoreceptor drive (not shown) so that the modulated light beam 110 incident and reflected by the first facet 120 of the polygon mirror 102 as the first reflected modulated beam 128 contains the appropriate signal information for the scan line on the first photoreceptor 104 and operate the second photoreceptor drive (not shown) so that the modulated light beam 110 incident and reflected by the second facet 122 of the polygon mirror 102 as the second reflected modulated beam 130 contains the appropriate signal information for the scan line on the second photoreceptor 106.

As opposed to the internal modulation within the light source, the light beam can be modulated by any suitable external acousto-optic or electro-optical modulator. The light beam will be emitted from the light source as an unmodulated coherent beam and then directed to the external modulator which will modulate the beam in conformance with the information contained in the video signal sent from the image output control circuit to the modulator.

Figure 4:
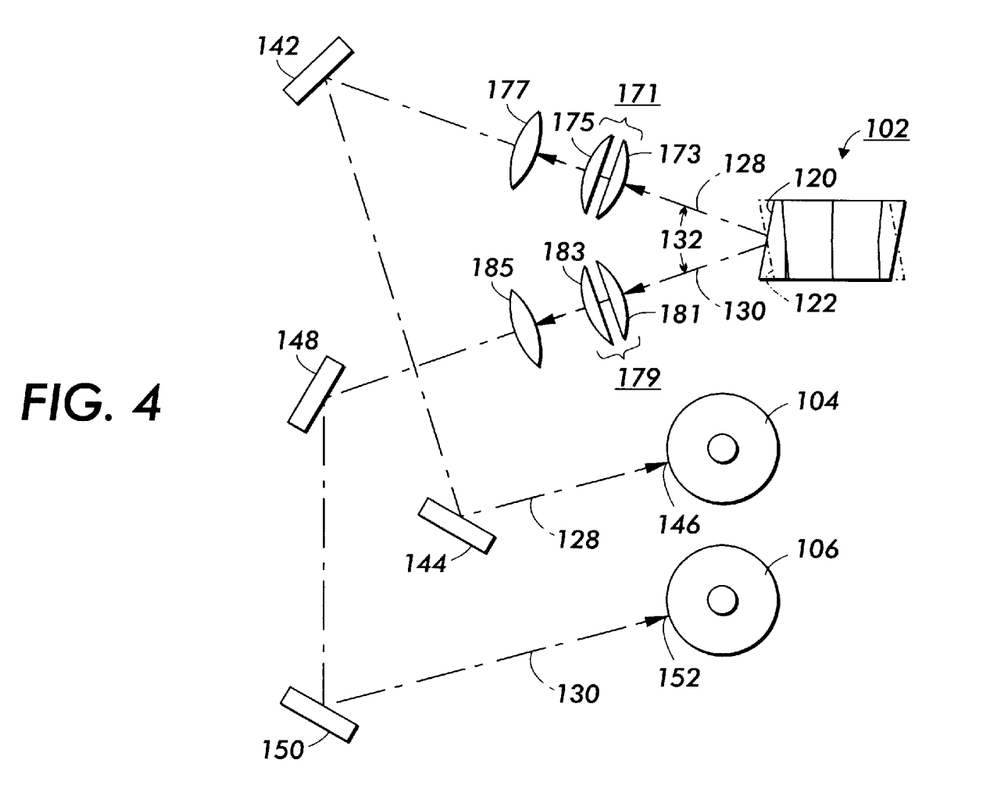
FIG. 4 illustrates the side view of the rotating polygon mirror with adjacent facets having different tilt angles of FIG. 1 with sufficient angular beam separation for separate f-theta scan lenses.

As shown in the alternate embodiment of FIG. 4, the angular beam separation 132 between the two beams 112 and 114 after reflection from the first facet 120 and the second facet 122 can be sufficiently wide enough, typically greater than 10 degrees, and there can a sufficient distance between the optical elements of the rotating polygon mirror and the f-theta scan lenses so that the two split reflected beams can have separate f-theta scan lenses in addition to separate MCO elements.

The first modulated reflected light beam 128 is reflected from the first facet 120 and the second modulated beam 130 is reflected from the second facet 122 of the rotating polygon mirror 102.

The first beam 128 will then pass through a first f-theta scan lenses 171 consisting of a first negative piano-spherical lens 173 and a first positive plano-spherical lens 175. This f-theta scan lenses configuration has sufficient barrel distortion to produce a linear scan beam which then passes through a first cylindrical lens 177.

A first fold mirror 142 (which may not be necessary if the angular separation 132 or optical element separation is sufficiently large) will reflect the first reflected modulated beam 128 from the first f-theta scan lenses 171 and cylindrical lens 177 to the first motion compensating optical (MPO) element 144, which is a wobble correction mirror in this embodiment. The first motion compensating optical (MPO) element 144 will also focus the first reflected modulated beam 128 onto a scan line 146 on the first photoreceptor 104.

Similarly, the second modulated reflected beam 130 is reflected from the second facet 122 of the rotating polygon mirror 102.

The second beam 130 will then pass through a second f-theta scan lenses 179 consisting of a second negative plano-spherical lens 181 and a second positive plano-spherical lens 183. This f-theta scan lenses configuration has sufficient barrel distortion to produce a linear scan beam which then passes through a second cylindrical lens 185.

A second fold mirror 148 (which may not be necessary if the angular separation 132 or optical element separation is sufficiently large) will reflect the second reflected modulated beam 130 from the f-theta scan lenses 179 and cylindrical lens 185 to the second motion compensating optical (MPO) element 150, which is a wobble correction mirror in this embodiment. The second motion compensating optical (MPO) element 150 will also focus the second reflected modulated beam 130 onto a scan line 152 on the second photoreceptor 106.

Figure 5:
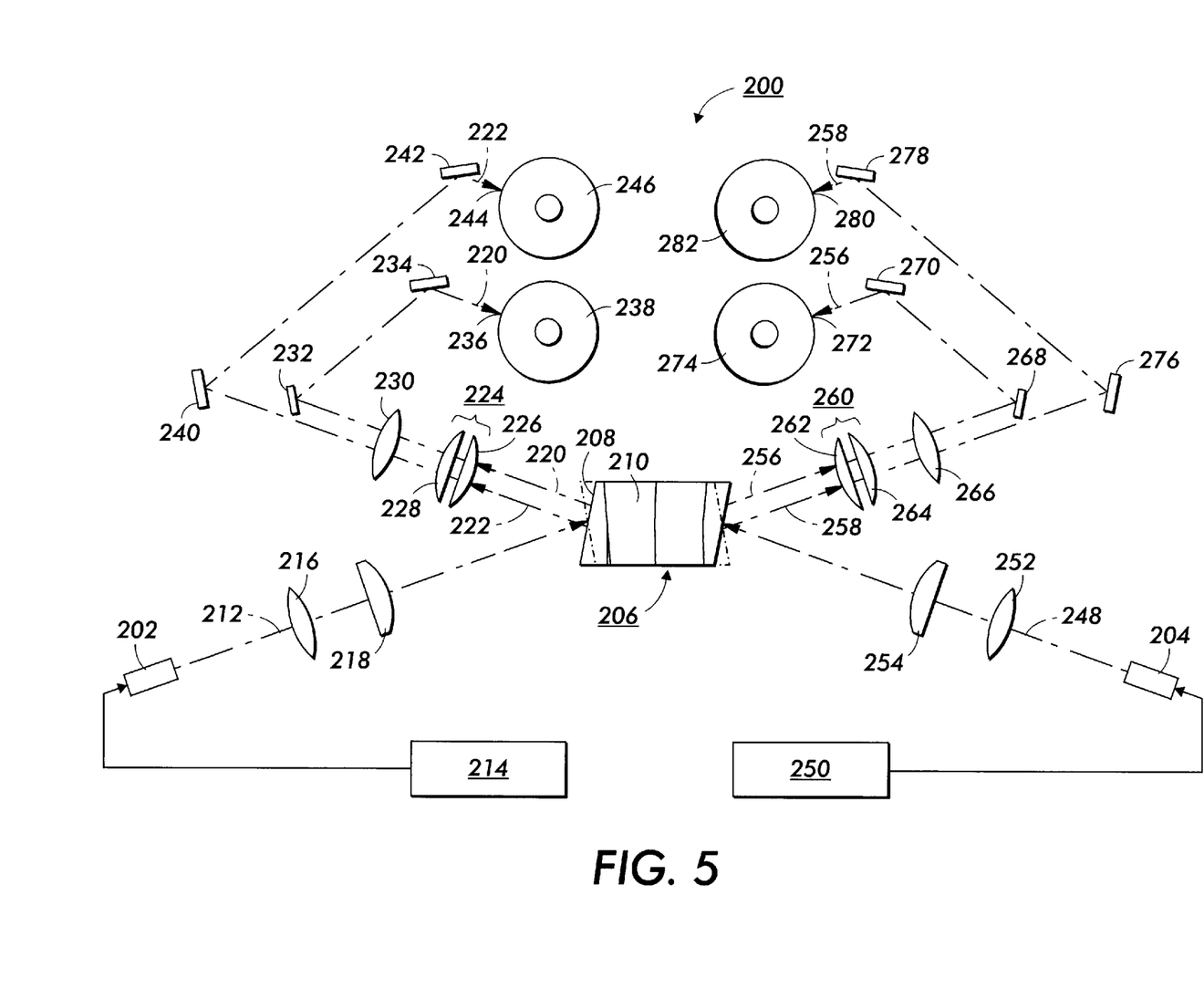
FIG. 5 illustrates a side view of an alternate embodiment of the raster output scanning (ROS) system with a single rotating polygon mirror with adjacent facets having different tilt angles to direct a first light beam on one side of the polygon mirror to two photoreceptors and to direct a second light beam on the other side of the polygon mirror to two other photoreceptors of the present invention.

As shown in FIG. 5, the raster output scanning system 200 has a first light source 202 and a second light source 204 on opposite sides of the single rotating polygon mirror 206. The polygon mirror 206 of FIG. 5 is identical to the polygon mirror 102 of FIGS. 1, 2 and 3 with alternating first facets 208 of a first tilt angle adjacent to second facets 210 of a second tilt angle, different from the first tilt angle.

The first light source 202, such as a laser diode, emits a first modulated coherent light beam 212 of a single wavelength. The first light beam 212 is modulated in conformance with the information contained in the video signal sent from the first image output control circuit 214 to the first light source 202.

The first modulated light beam 212 is collimated by a collimating lens 216 and then focused a cylindrical lens 218 onto the facets of the rotating polygon mirror 206.

The first modulated light beam 212 is reflected from the first facet 208 and the second facet 210 of the rotating polygon mirror 206 as a first reflected modulated beam 220 and a second reflected modulated beam 222, respectively.

The two beams 220 and 222 then pass through a f-theta scan lenses 224 (consisting of a negative plano-spherical lens 226 and a positive plano-spherical lens 228) and a cylindrical lens 230.

A first fold mirror 232 (sometimes referred to as a "pick-off" mirror) will reflect the first reflected modulated beam 220 from the f-theta scan lenses 224 and cylindrical lens 230 to the first motion compensating optical (MPO) element 234, which is a wobble correction mirror in this embodiment. The first motion compensating optical (MPO) element 234 will also focus the first reflected modulated beam 220 onto a scan line 236 on the first photoreceptor 238.

A second fold mirror 240 will reflect the second reflected modulated beam 222 from the f-theta scan lenses 224 and cylindrical lens 230 to the second motion compensating optical (MPO) element 242, which is a wobble correction mirror in this embodiment. The second motion compensating optical (MPO) element 242 will also focus the second reflected modulated beam 222 onto a scan line 244 on the second photoreceptor 246.

The second light source 204 is on the opposite side of the single rotating polygon mirror 206 from the first light source 202.

The second light source 204, such as a laser diode, emits a second modulated coherent light beam 248 of a single wavelength. The second light beam 248 is modulated in conformance with the information contained in the video signal sent from the second image output control circuit 250 to the second light source 204.

The second light source will be emitting a light beam to reflect from the facets of the rotating polygon mirror contemporaneously with the first light source emitting a light beam to reflect from the facets of the rotating polygon mirror.

The second modulated light beam 248 is collimated by a collimating lens 252 and then focused a cylindrical lens 254 onto the facets of the rotating polygon mirror 206.

The second modulated light beam 248 is reflected from the first facet 208 and the second facet 210 of the rotating polygon mirror 206 as a third reflected modulated beam 256 and a fourth reflected modulated beam 258, respectively.

The two beams 256 and 258 then pass through a f-theta scan lenses 260 (consisting of a negative plano-spherical lens 262 and a positive plano-spherical lens 264) and a cylindrical lens 266.

A third fold mirror 268 will reflect the third reflected modulated beam 256 from the f-theta scan lenses 260 and cylindrical lens 266 to the third motion compensating optical (MPO) element 270, which is a wobble correction mirror in this embodiment. The third motion compensating optical (MPO) element 270 will also focus the third reflected modulated beam 256 onto a scan line 272 on the third photoreceptor 274.

A fourth fold mirror 276 will reflect the fourth reflected modulated beam 258 from the f-theta scan lenses 260 and cylindrical lens 266 to the fourth motion compensating optical (MPO) element 278, which is a wobble correction mirror in this embodiment. The second motion compensating optical (MPO) element 278 will also focus the fourth reflected modulated beam 258 onto a scan line 280 on the fourth photoreceptor 282.

The light sources and corresponding photoreceptors need not be on opposite sides of the single polygon mirror of the raster output scanning system. More than two light sources and corresponding photoreceptors can be used with the single polygon mirror of the raster output scanning system. The only optical requirements for the use of multiple light sources is that the modulated light beams do not strike the same facet at the same time. Accordingly, each of the adjacent facets with different tilt angles can be reflecting light beams from multiple light sources as they rotate.

Figure 6:
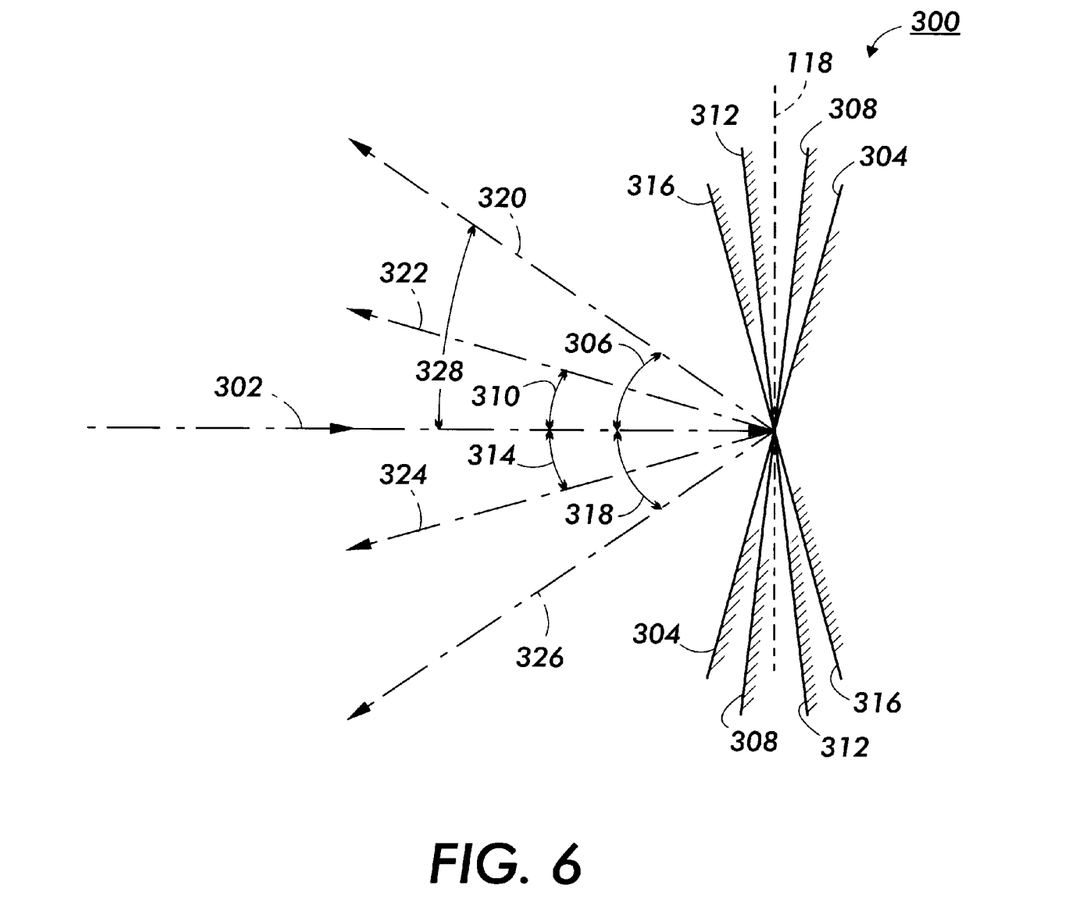
FIG. 6 illustrates a side view of a light beam reflected and split into four beams by the rotating polygon mirror with adjacent facets having different tilt angles of the present invention.

The rotating polygon mirror 300 of FIG. 6 has four adjacent facets, each with a different tilt angle, to split and reflect an incident modulated light beam 302 into four separate modulated beams.

The polygon mirror 300 has a first facet 304 at a first tilt angle 306, a second facet 308 at a second tilt angle 310, a third facet 312 at a third tilt angle 314 and a fourth facet 316 at a fourth tilt angle 318. The tilt angles 306, 310, 314 and 318 are all different. The facets 304, 308, 312 and 316 are flat mirror surfaces with no optical power.

The modulated light beam 302 will reflect from the first facet 304 at the first tilt angle 306 becoming the first reflected modulated beam 320. The modulated light beam 302 will reflect from the second facet 308 at the second tilt angle 310 becoming the second reflected modulated beam 322.

The modulated light beam 302 will reflect from the third facet 312 at the third tilt angle 314 becoming the third reflected modulated beam 324. The modulated light beam 302 will reflect from the fourth facet 316 at the fourth tilt angle 318 becoming the fourth reflected modulated beam 326.

The facets 304, 308, 312 and 316 are in series along the circumference of the rotating polygon mirror 300, effectively splitting the modulated light beam 302 into four beams: i.e., the first reflected modulated beam 320, the second reflected modulated beam 322, the third reflected modulated beam 324 and the fourth reflected modulated beam 326. Adjacent reflected modulated light beams 320 and 322 or 322 and 324 or 324 and 326 will have an angular separation 328 of 0.5 to 5 degrees equivalent to the combination of the tilt angles.

Figure 7:
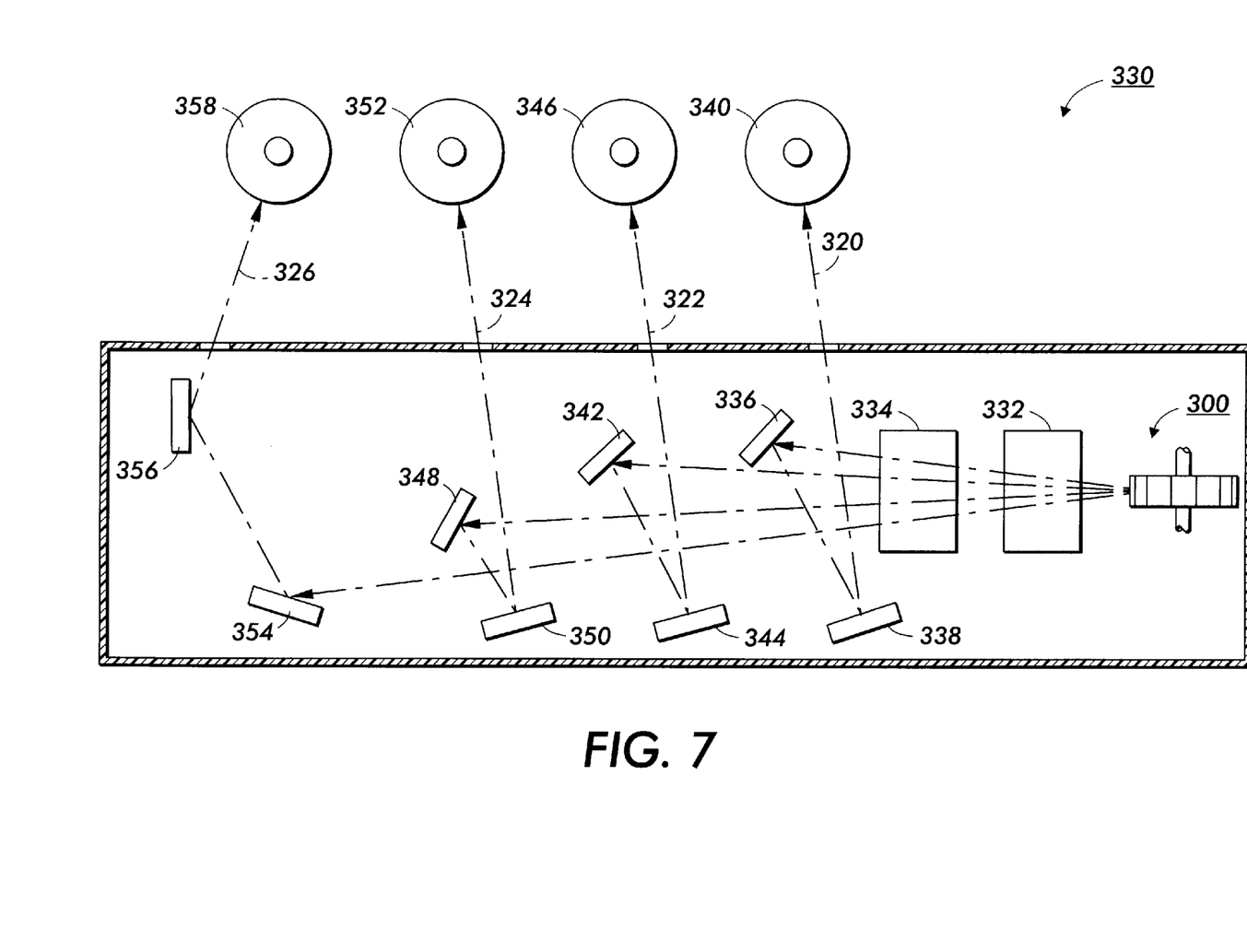
FIG. 7 illustrates a side view of an alternate embodiment of the raster output scanning (ROS) system with the rotating polygon mirror of FIG. 6.

As can be seen in the simplified FIG. 7, the raster output scanning (ROS) system 330 has the rotating polygon mirror 300 of FIG. 6 reflect the first reflected modulated beam 320 through the f-theta scan lenses 332 and cylindrical lens 334 to a first fold mirror 336 where it is reflected to a first MCO element 338, a wobble correction mirror. The MCO element 338 will reflect and focus the beam 320 to a scan line on the first photoreceptor 340.

The rotating polygon mirror 300 will reflect the second reflected modulated beam 322 through the f-theta scan lenses 332 and cylindrical lens 334 to a second fold mirror 342 where it is reflected to a second MCO element 344, a wobble correction mirror. The MCO element 344 will reflect and focus the beam 322 to a scan line on the second photoreceptor 346.

The rotating polygon mirror 300 will reflect the third reflected modulated beam 324 through the f-theta scan lenses 332 and cylindrical lens 334 to a third fold mirror 348 where it is reflected to a third MCO element 350, a wobble correction mirror. The MCO element 350 will reflect and focus the beam 324 to a scan line on the third photoreceptor 352.

The rotating polygon mirror 300 will reflect the fourth reflected modulated beam 326 through the f-theta scan lenses 332 and cylindrical lens 334 to a fourth fold mirror 354 where it is reflected to a second MCO element 356, a wobble correction mirror. The MCO element 356 will reflect and focus the beam 326 to a scan line on the fourth photoreceptor 358.

The light sources and some of the optical elements are not shown for ease of understanding, although they would be equivalent to the prior elements previously discussed in this invention.

Since the polygon mirror has four different tilt angled facets and a single light source, as shown in FIG. 7, the photoreceptors will be on the same side of the polygon mirror as the light source (not shown).

The first and second beams can share a common f-theta scan lenses and the third and fourth beams can share another common f-that scan lenses.

Since the number of scan lines on a particular photoreceptor is reduced in half by the use of two adjacent facets with different tilt angles (and reduced proportionally by three or four facets with different tilt angles), the ROS described in this invention can use a dual or multiple beam light source to increase the number of scan lines on a particular photoreceptor.

While the invention has been described in conjunction with specific embodiments, it is evident to those skilled in the art that many alternatives, modifications and variations will be apparent in light of the foregoing description. Accordingly, the invention is intended to embrace all such alternatives, modifications and variations as fall within the spirit and scope of the appended claims.

What is claimed is:

1. A raster output scanning system comprising
   a light source emitting a light beam that is modulated in accordance with an input video data signal,
   a first photoreceptor and a second photoreceptor, and
   a rotating polygon mirror having
      a first plurality of facets having a first tilt angle relative to the axis of rotation of said rotating polygon mirror, and
      a second plurality of facets, alternating with said first plurality, said second plurality of facets having a second tilt angle relative to the axis of rotation of said rotating polygon mirror, said second tilt angle being different from said first tilt angle,
      said first plurality of facets reflecting said modulated light beam to scan across a line on said first photoreceptor, and said second plurality of facets reflecting said modulated light beam to scan across a line on said second photoreceptor.

2. The raster output scanning of claim 1 further comprising means for modulating said emitted light beam in accordance with a input video data signal, whereby said modulated light beam reflected from said first plurality of facets has the appropriate data signal for said first photoreceptor and said modulated light beam reflected from said second plurality of facets has the appropriate data signal for said second photoreceptor.

3. The raster output scanning of claim 1 further comprising a f-theta scan lens for focusing said modulated light beam from said first plurality of facets of said rotating polygon mirror onto said first photoreceptor and for focusing said modulated light beam from said second plurality of facets of said rotating polygon mirror onto second first photoreceptor.

4. The raster output scanning system of claim 3 further comprising a first fold mirror for directing said modulated light beam from said f-theta scan lens to said first photoreceptor and a second fold mirror for directing said modulated light beam from said f-theta scan lens to said second photoreceptor.

5. The raster output scanning of claim 1 further comprising a first f-theta scan lens for focusing said modulated light beam from said first plurality of facets of said rotating polygon mirror onto said first photoreceptor and a second f-theta scan lens for focusing said modulated light beam from said second plurality of facets of said rotating polygon mirror onto second first photoreceptor.

6. The raster output scanning system of claim 5 further comprising a first fold mirror for directing said modulated light beam from said first f-theta scan lens to said first photoreceptor and a second fold mirror for directing said modulated light beam from said second f-theta scan lens to said second photoreceptor.

7. A raster output scanning system comprising
 a first light source emitting a first light beam that is modulated in accordance with a first input video data signal,
 a second light source emitting a second light beam that is modulated in accordance with a second input video data signal,
 a first photoreceptor and a second photoreceptor,
 a third photoreceptor and a fourth photoreceptor, and
 a rotating polygon mirror having
  a first plurality of facets having a first tilt angle relative to the axis of rotation of said rotating polygon mirror, and
  a second plurality of facets, alternating with said first plurality, said second plurality of facets having a second tilt angle relative to the axis of rotation of said rotating polygon mirror, said second tilt angle being different from said first tilt angle,
  said first plurality of facets reflecting said first modulated light beam to scan across a line on said first photoreceptor, and said second plurality of facets reflecting said first modulated light beam to scan across a line on said second photoreceptor contemporaneously with said first plurality of facets reflecting said second modulated light beam to scan across a line on said third photoreceptor, and said second plurality of facets reflecting said second modulated light beam to scan across a line on said fourth photoreceptor.

8. The raster output scanning of claim 7 further comprising means for modulating said first emitted light beam and said second emitted light beam in accordance with a input video data signal, whereby said first modulated light beam reflected from said first plurality of facets has the appropriate data signal for said first photoreceptor, said first modulated light beam reflected from said second plurality of facets has the appropriate data signal for said second photoreceptor, said second modulated light beam reflected from said first plurality of facets has the appropriate data signal for said third photoreceptor, and said second modulated light beam reflected from said second plurality of facets has the appropriate data signal for said fourth photoreceptor.

9. The raster output scanning of claim 7 further comprising a first f-theta scan lens for focusing said first modulated light beam from said first plurality of facets of said rotating polygon mirror onto said first photoreceptor and for focusing said modulated light beam from said second plurality of facets of said rotating polygon mirror onto second first photoreceptor and a second f-theta scan lens for focusing said second modulated light beam from said first plurality of facets of said rotating polygon mirror onto said third photoreceptor and for focusing said modulated light beam from said second plurality of facets of said rotating polygon mirror onto fourth first photoreceptor.

10. The raster output scanning system of claim 9 further comprising a first fold mirror for directing said first modulated light beam from said first f-theta scan lens to said first photoreceptor, a second fold mirror for directing said first modulated light beam from said first f-theta scan lens to said second photoreceptor, a third fold mirror for directing said second modulated light beam from said second f-theta scan lens to said third photoreceptor, a fourth fold mirror for directing said second modulated light beam from said second f-theta scan lens to said fourth photoreceptor.

11. The raster output scanning of claim 7 further comprising a first f-theta scan lens for focusing said first modulated light beam from said first plurality of facets of said rotating polygon mirror onto said first photoreceptor, a second f-theta scan lens for focusing said first modulated light beam from said second plurality of facets of said rotating polygon mirror onto said second photoreceptor, a third f-theta scan lens for focusing said second modulated light beam from said first plurality of facets of said rotating polygon mirror onto said third photoreceptor, and a fourth f-theta scan lens for focusing said second modulated light beam from said second plurality of facets of said rotating polygon mirror onto said fourth photoreceptor.

12. The raster output scanning system of claim 11 further comprising a first fold mirror for directing said first modulated light beam from said first f-theta scan lens to said first photoreceptor, a second fold mirror for directing said first modulated light beam from said second f-theta scan lens to said second photoreceptor, a third fold mirror for directing said second modulated light beam from said third f-theta scan lens to said third photoreceptor, a fourth fold mirror for directing said second modulated light beam from said fourth f-theta scan lens to said fourth photoreceptor.

13. A raster output scanning system comprising
 a light source emitting a light beam that is modulated in accordance with an input video data signal,
 a first photoreceptor, a second photoreceptor, a third photoreceptor and a fourth photoreceptor, and
 a rotating polygon mirror having
  a first plurality of facets having a first tilt angle relative to the axis of rotation of said rotating polygon mirror, and
  a second plurality of facets having a second tilt angle relative to the axis of rotation of said rotating polygon mirror,
  a third plurality of facets having a third tilt angle relative to the axis of rotation of said rotating polygon mirror, and
  a fourth plurality of facets having a fourth tilt angle relative to the axis of rotation of said rotating polygon mirror,
  said first plurality of facets, said second plurality of facets, said third plurality of facets and said fourth plurality of facets alternating around said polygon mirror, said first, second, third and fourth tilt angles being different from each other, said first plurality of facets reflecting said modulated light beam to scan across a line on said first photoreceptor, said second plurality of facets reflecting said modulated light beam to scan across a line on said second photoreceptor, said third plurality of facets reflecting said modulated light beam to scan across a line on said third photoreceptor, and said fourth plurality of facets reflecting said modulated light beam to scan across a line on said fourth photoreceptor.

14. The raster output scanning of claim 13 further comprising means for modulating said emitted light beam in accordance with a input video data signal, whereby said modulated light beam reflected from said first plurality of facets has the appropriate data signal for said first photoreceptor, said modulated light beam reflected from said second plurality of facets has the appropriate data signal for said second photoreceptor, said modulated light beam reflected from said third plurality of facets has the appropriate data signal for said third photoreceptor, and said modulated light beam reflected from said fourth plurality of facets has the appropriate data signal for said fourth photoreceptor.

15. The raster output scanning of claim 13 further comprising a first f-theta scan lens for focusing said modulated light beam from said first plurality of facets of said rotating polygon mirror onto said first photoreceptor, a second f-theta scan lens for focusing said modulated light beam from said second plurality of facets of said rotating polygon mirror onto said second photoreceptor, a third f-theta scan lens for focusing said modulated light beam from said third plurality of facets of said rotating polygon mirror onto said third photoreceptor, and a fourth f-theta scan lens for focusing said modulated light beam from said fourth plurality of facets of said rotating polygon mirror onto said fourth photoreceptor.

16. The raster output scanning system of claim 15 further comprising a first fold mirror for directing said modulated light beam from said first f-theta scan lens to said first photoreceptor, a second fold mirror for directing said modulated light beam from said second f-theta scan lens to said second photoreceptor, a third fold mirror for directing said modulated light beam from said third f-theta scan lens to said third photoreceptor, a fourth fold mirror for directing said modulated light beam from said fourth f-theta scan lens to said fourth photoreceptor.

17. A raster output scanning system comprising a light source emitting multiple light beams that are modulated in accordance with an input video data signal, a first photoreceptor and a second photoreceptor, and a rotating polygon mirror having a first plurality of facets having a first tilt angle relative to the axis of rotation of said rotating polygon mirror, and a second plurality of facets, alternating with said first plurality, said second plurality of facets having a second tilt angle relative to the axis of rotation of said rotating polygon mirror, said second tilt angle being different from said first tilt angle, said first plurality of facets reflecting said modulated multiple light beams to scan across multiple lines on said first photoreceptor, and said second plurality of facets reflecting said modulated multiple light beams to scan across multiple lines on said second photoreceptor.

* * * * *